United States Patent
Gasser

(10) Patent No.: US 8,998,356 B2
(45) Date of Patent: Apr. 7, 2015

(54) FASTENING DEVICE FOR WALL PARTS

(71) Applicant: Julius Blum GmbH, Hochst (AT)

(72) Inventor: Ingo Gasser, Hochst (AT)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 13/898,868

(22) Filed: May 21, 2013

(65) Prior Publication Data

US 2013/0257251 A1     Oct. 3, 2013

Related U.S. Application Data

(63) Continuation of application No. PCT/AT2011/000469, filed on Nov. 18, 2011.

(30) Foreign Application Priority Data

Nov. 23, 2010   (AT)  ................ A 1945/2010

(51) Int. Cl.
     *A47B 88/00*      (2006.01)
     *F16B 12/00*      (2006.01)
     *F16B 12/26*      (2006.01)

(52) U.S. Cl.
     CPC ............ *F16B 12/00* (2013.01); *A47B 88/0014* (2013.01); *F16B 12/26* (2013.01); *A47B 2088/0037* (2013.01)

(58) Field of Classification Search
     CPC .................. A47B 2088/0037; A47B 88/0059; A47B 88/0014; A47B 2210/02
     USPC ............. 312/348.1–348.2, 348.4, 265.5, 263, 312/111, 140; 403/327, 403
See application file for complete search history.

(56) References Cited

U.S. PATENT DOCUMENTS

| | | | |
|---|---|---|---|
| 3,752,553 A | | 8/1973 | Bildahl et al. |
| 4,042,288 A | * | 8/1977 | Litchfield .................. 312/348.2 |
| 4,099,815 A | * | 7/1978 | Cox et al. .................. 312/348.2 |
| 4,108,520 A | * | 8/1978 | Litchfield .................. 312/348.2 |

(Continued)

FOREIGN PATENT DOCUMENTS

| | | |
|---|---|---|
| CN | 2276742 | 3/1998 |
| CN | 101606787 | 12/2009 |

(Continued)

OTHER PUBLICATIONS

International Search Report (ISR) mailed Apr. 23, 2012 in International (PCT) Application No. PCT/AT2011/000469.

(Continued)

*Primary Examiner* — Hanh V Tran
(74) *Attorney, Agent, or Firm* — Wenderoth, Lind & Ponack, L.L.P.

(57) ABSTRACT

A fastening device connects two wall parts of a furniture part, in particular a rear wall to a side wall of a drawer. The fastening device has at least one locking projection resilient about an imaginary spring axis on one wall part, which locking projection can be locked—preferably detachably—into a locking receptacle fastened to or formed on the other wall part. The imaginary spring axis of the locking projection is at an angle—preferably substantially at a right angle—from a wall of the wallpart. The locking receptacle is formed on the other wall part as an opening, and an imaginary normal on the opening is substantially parallel to the imaginary spring axis of the resilient locking projection.

16 Claims, 8 Drawing Sheets

(56) References Cited

U.S. PATENT DOCUMENTS

| | | | | |
|---|---|---|---|---|
| 4,303,289 A | * | 12/1981 | Hardy | 312/348.2 |
| 4,691,970 A | * | 9/1987 | Neri | 312/265.5 |
| 5,221,134 A | * | 6/1993 | Grass | 312/348.2 |
| 6,053,593 A | * | 4/2000 | Rock | 312/348.2 |
| 6,938,784 B2 | * | 9/2005 | Yang | 211/87.01 |

FOREIGN PATENT DOCUMENTS

| | | |
|---|---|---|
| DE | 32 18 504 | 12/1982 |
| GB | 1 431 046 | 4/1976 |
| GB | 2 101 879 | 1/1983 |
| WO | 2010/036215 | 4/2010 |

OTHER PUBLICATIONS

Austrian Patent Office Search Report (ASR) completed Aug. 12, 2011 in Austrian Patent Application No. A 1945/2010.

Chinese Search Report (OA) issued in parallel Chinese Application No. 201180056176.3.

\* cited by examiner

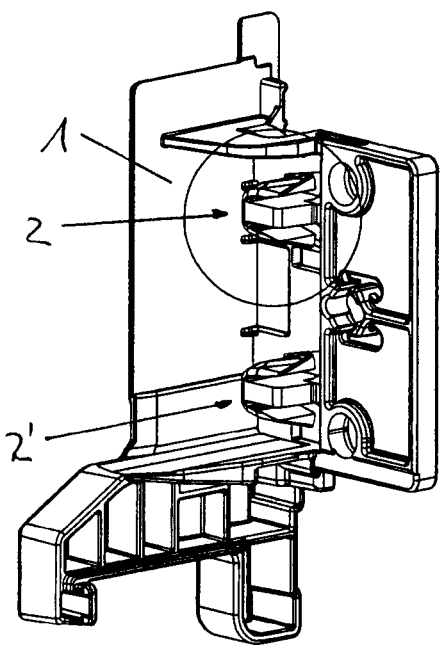
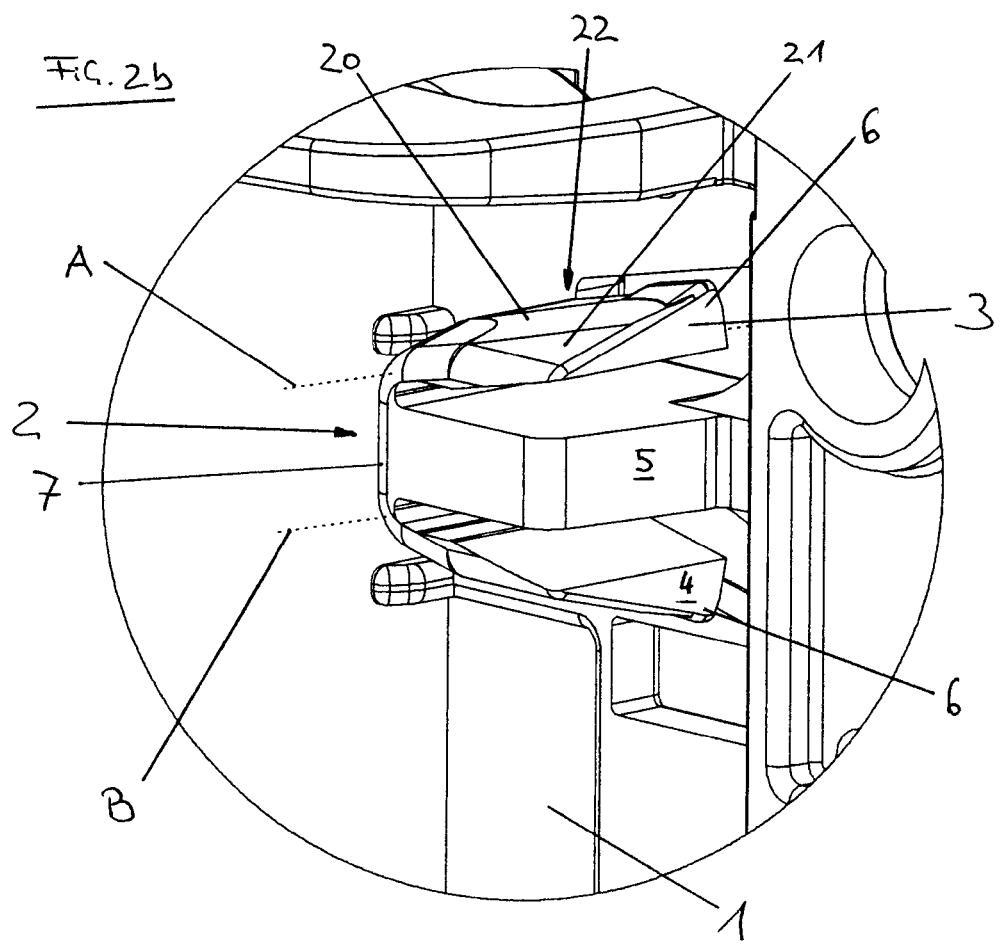

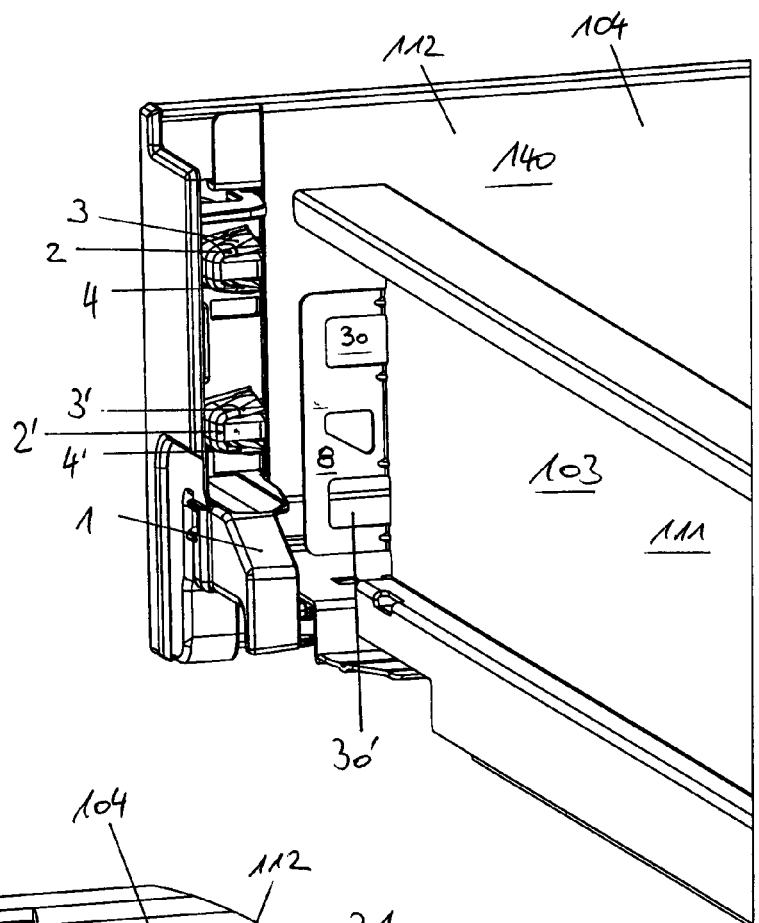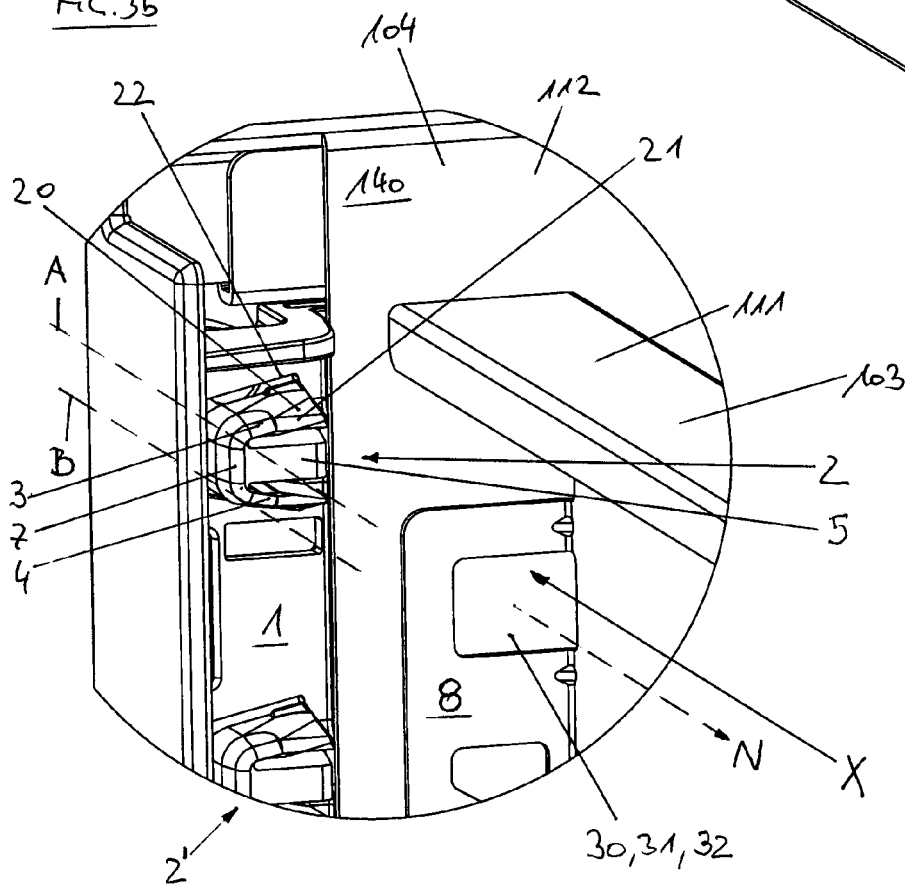

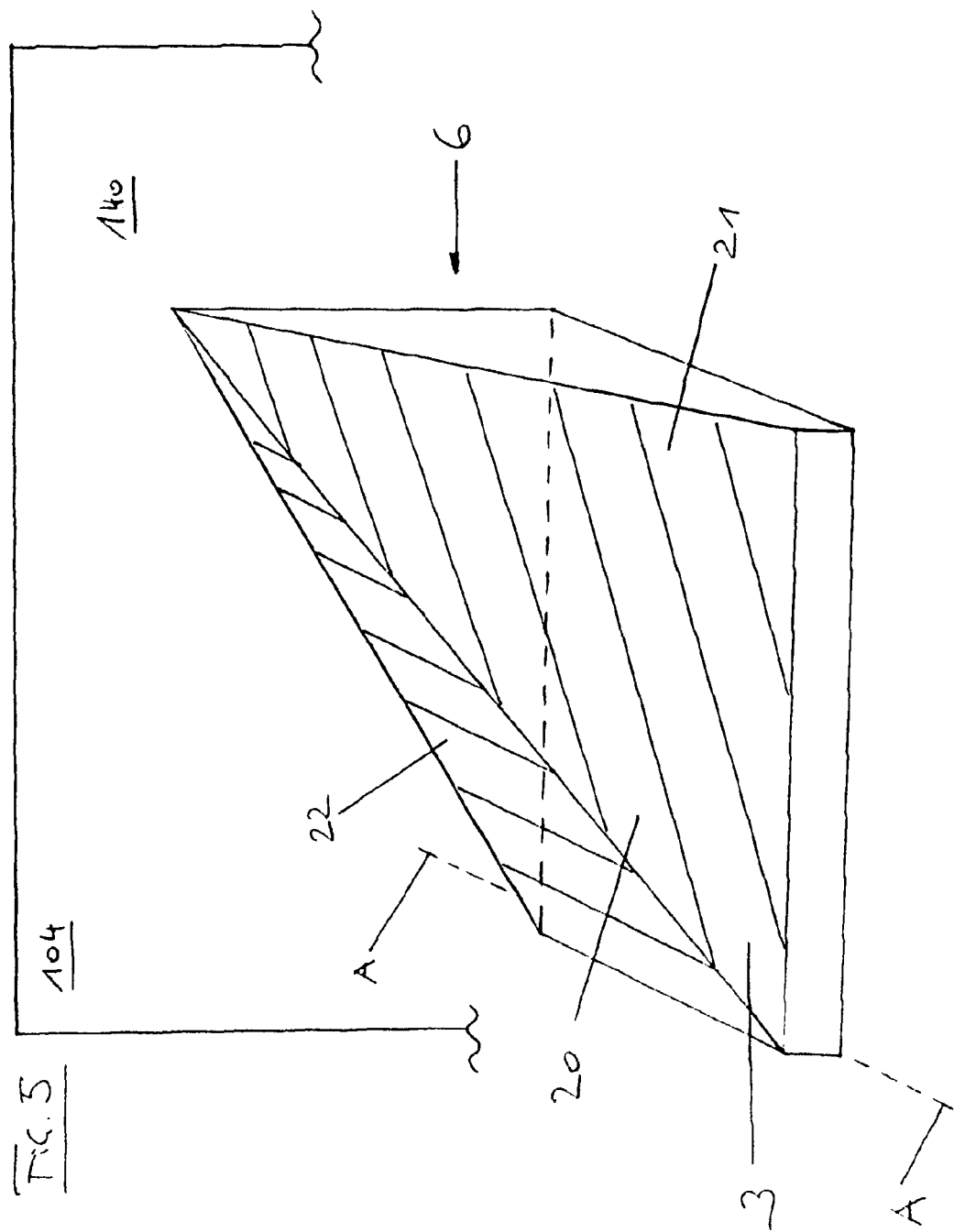

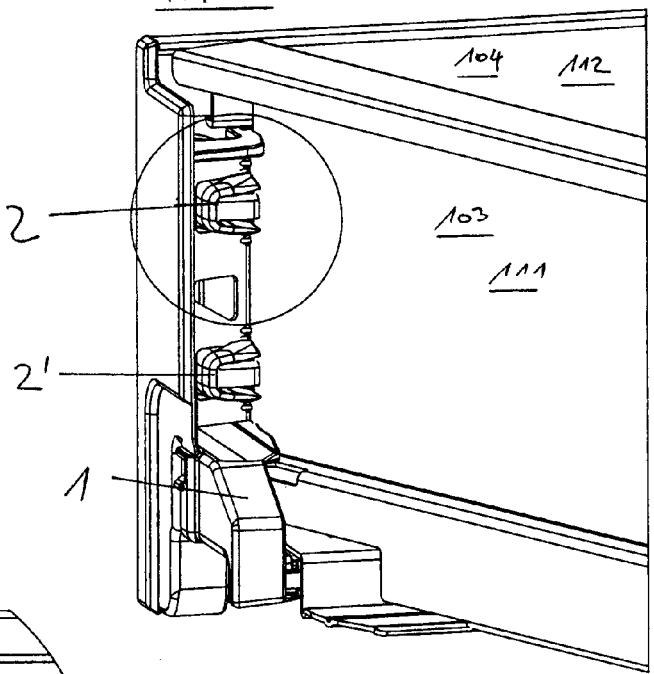
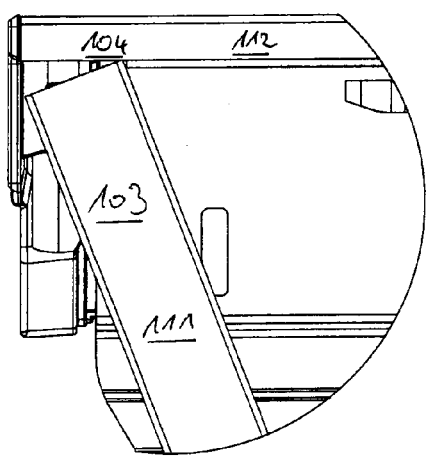
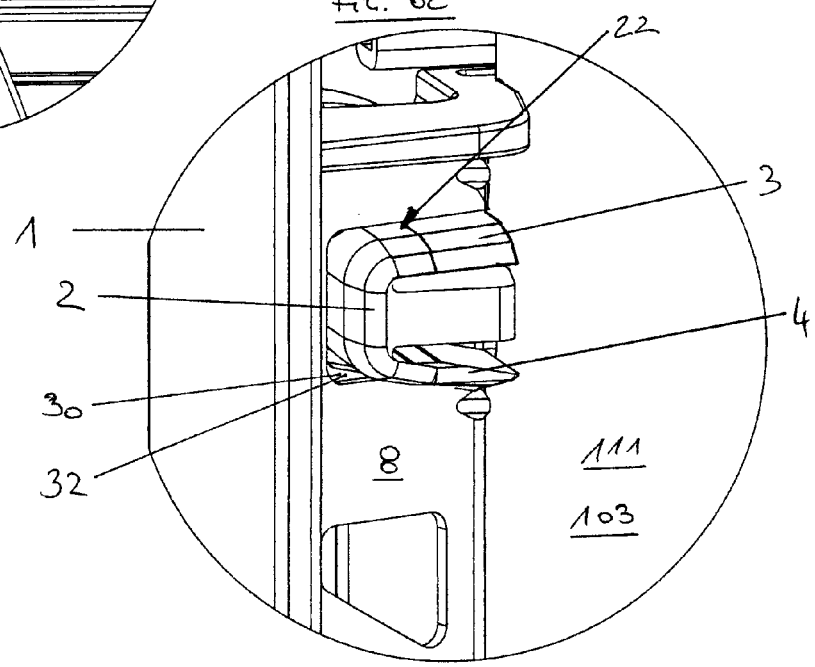

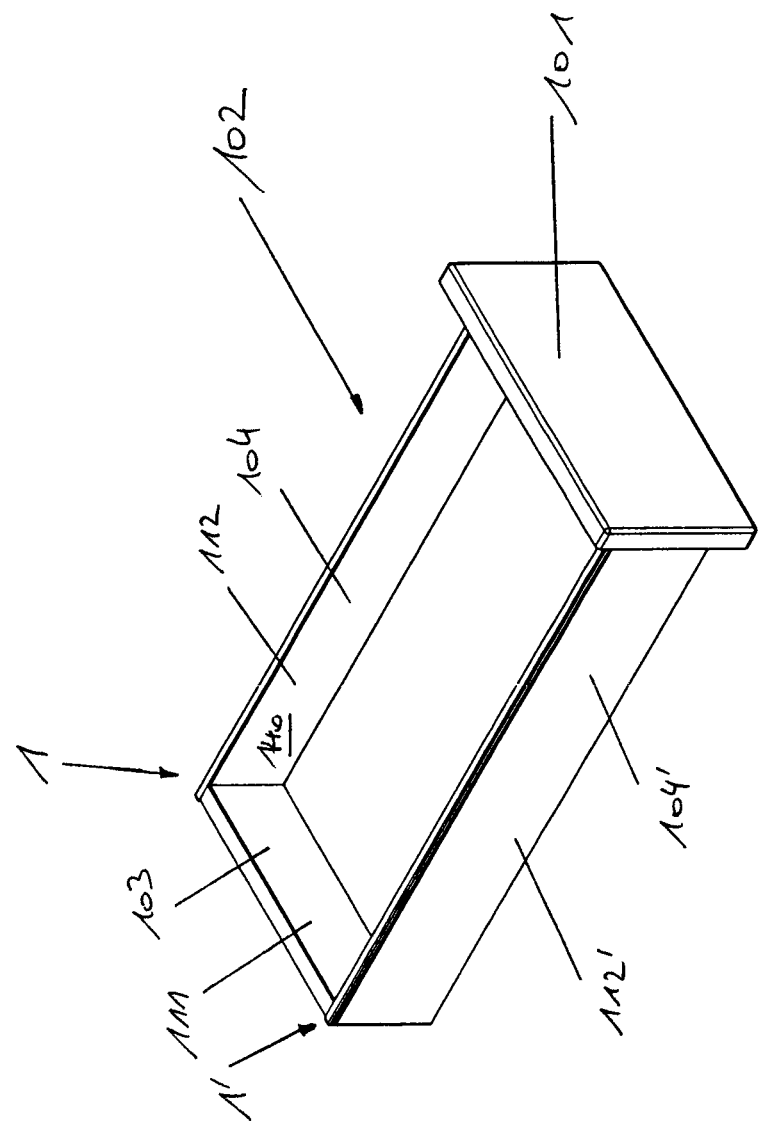

FASTENING DEVICE FOR WALL PARTS

BACKGROUND OF THE INVENTION

The invention concerns a fastening device for connecting two wall parts of a furniture part, in particular a rear wall to a side wall of a drawer. The fastening device on a wall part has at least one resilient latch which is resilient about a notional spring axis and which is —preferably releasably—latchable into a latching receiving means provided or fastened to the other wall part.

Furthermore, the invention concerns a connecting fitting for transversely connecting two wall parts of a furniture part with a fastening device of the kind to be described. The invention further concerns a drawer and an article of furniture having a connecting fitting of the specified kind.

Fastening devices of that kind already form part in large numbers of the state of the art. Thus, for example, DE 32 18 504 C2 of 25 Mar. 1993 discloses a fastening device, by means of which a rear wall can be connected to a side wall of a drawer. In that case, the fastening device has two resilient latches arranged at a wall of the drawer, which correspond to recesses in a further wall.

SUMMARY OF THE INVENTION

The object of the invention is to provide a fastening device which is improved over the state of the art.

This object is therefore achieved in that the notional spring axis of the resilient latch is provided transversely—preferably substantially at a right angle—relative to a wall of the wall part. The latching receiving means on the other wall part is in the form of an opening, and a notional normal to the opening extends substantially parallel to the notional spring axis of the resilient latch.

In other words, this means that the push-on direction of the latching receiving means extends substantially parallel—not at a right angle—to the notional spring axis of the resilient latch and thus a joining direction extends substantially parallel to the notional spring axis of the resilient latch and thereby the latching receiving means is movable in a sole single joining direction until reaching an end latching position over the resilient resilient latch, and that permits extremely simple assembly.

As a result, the longitudinal extent of the resilient latch is not at a right angle to the wall of the wall part but preferably extends substantially parallel to that wall. Thus, the width of the wall part has no influence on the possible length of the resilient latch. In that way, even very narrow wall parts can also be connected to a further wall part, with such a fastening device.

In the fastening devices belonging to the state of the art, in contrast, the width of the wall part is directly related to the length of the resilient latch as those resilient latches are disposed substantially perpendicularly to the wall of the wall part and can extend therefore at a maximum over the width of the wall part, without in that case projecting beyond the wall part.

The fastening device thus provides a compact solution for a fastening device for connecting two wall parts of a furniture part.

It has proven to be particularly advantageous if the fastening device has at least one second resilient latch whose notional spring axis is provided transversely—preferably substantially at a right angle—to a wall of the wall part. A more stable fastening device can be achieved by means of a second resilient latch.

In a preferred embodiment, the two resilient latches can be substantially parallel to each other and be connected together. That measure can also contribute to a more stable structure for the fastening device.

Furthermore, a limb can be provided between the two resilient latches. The provision of a limb between the two resilient latches can also enhance the stability of the fastening device.

It has proven to be particularly advantageous if the fastening device is in one piece. A one-piece embodiment of the fastening device can contribute to reducing the fitment times.

Preferably, the fastening device is made from plastic material. The structure of plastic material simplifies manufacture of the fastening device as it can be produced for example in an injection molding process.

In that respect, it has proven to be particularly advantageous if the resilient latch has an inclined surface, wherein a portion of the inclined surface rises towards the wall part and another portion rises from the notional spring axis towards the free end of the resilient latch. The configuration of two different portions of the inclined surface makes it possible on the one hand for the latching receiving means to be pushed on towards the wall part over a portion of the inclined surface, over the resilient latch, and can then be latched, while on the other hand for the latched latching receiving means to be released from the resilient latch again, more specifically when the latching receiving means is pushed over the second portion of the inclined surface, that rises from the notional spring axis towards the free end of the resilient latch. That makes it possible to achieve destruction-free separation of the latching receiving means from the fastening device.

It has further proven to be advantageous if the latching receiving means on the other wall part is in the form of a through opening. A latching receiver in the form of a through opening can be technically readily implemented and can afford advantages in regard to stability.

It has proven to be advantageous if the fastening device is adapted to be releasable without a tool. Disengagement of the fastening device from its latched condition, without a tool, can contribute to short dismantling times, which can have the effect of reducing costs.

Preferably, the fastening device can be located at the side wall of a drawer, and the latching receiver can be located at the rear wall of a drawer.

Protection is also claimed for a connecting fitting for transversely connecting two wall parts of a furniture part with a—in particular two—fastening device of the above-indicated kind.

In that respect, the connecting fitting is preferably in one piece. The design configuration in the form of a one-piece connecting fitting can contribute to reducing production costs as it can be produced in an inexpensive injection molding process.

A drawer can also have at least one—in particular two—connecting fittings of the above-indicated kind.

An article of furniture can also have at least one drawer of the above-indicated kind.

BRIEF DESCRIPTION OF THE DRAWINGS

Further details and advantages of the present invention will be described by means of the specific description with reference to the drawings, in which:

FIG. 2*a* shows a further perspective view of a connecting fitting as shown in FIG. 1, FIG. 2b shows a detail view of a fastening device of a connecting fitting as shown in FIG. 2a, FIG. 3a shows a perspective view of two wall parts of a furniture part with a connecting fitting with two fastening devices, the two wall parts being in the separated condition, FIG. 3b shows a perspective detail view of FIG. 3a, FIG. 4a shows a perspective view of two wall parts as shown in FIG. 3a but in the connected condition, FIG. 5 shows a diagrammatic perspective view of a resilient latch, FIG. 6a shows a plan view of two wall parts of a furniture part in the non-fastened position, FIG. 6b shows a perspective view of the two wall parts as shown in FIG. 6a, FIG. 6c shows a detail view of FIG. 6b, FIG. 7 shows a perspective view of a drawer.

DETAILED DESCRIPTION OF THE INVENTION

Figure 1:
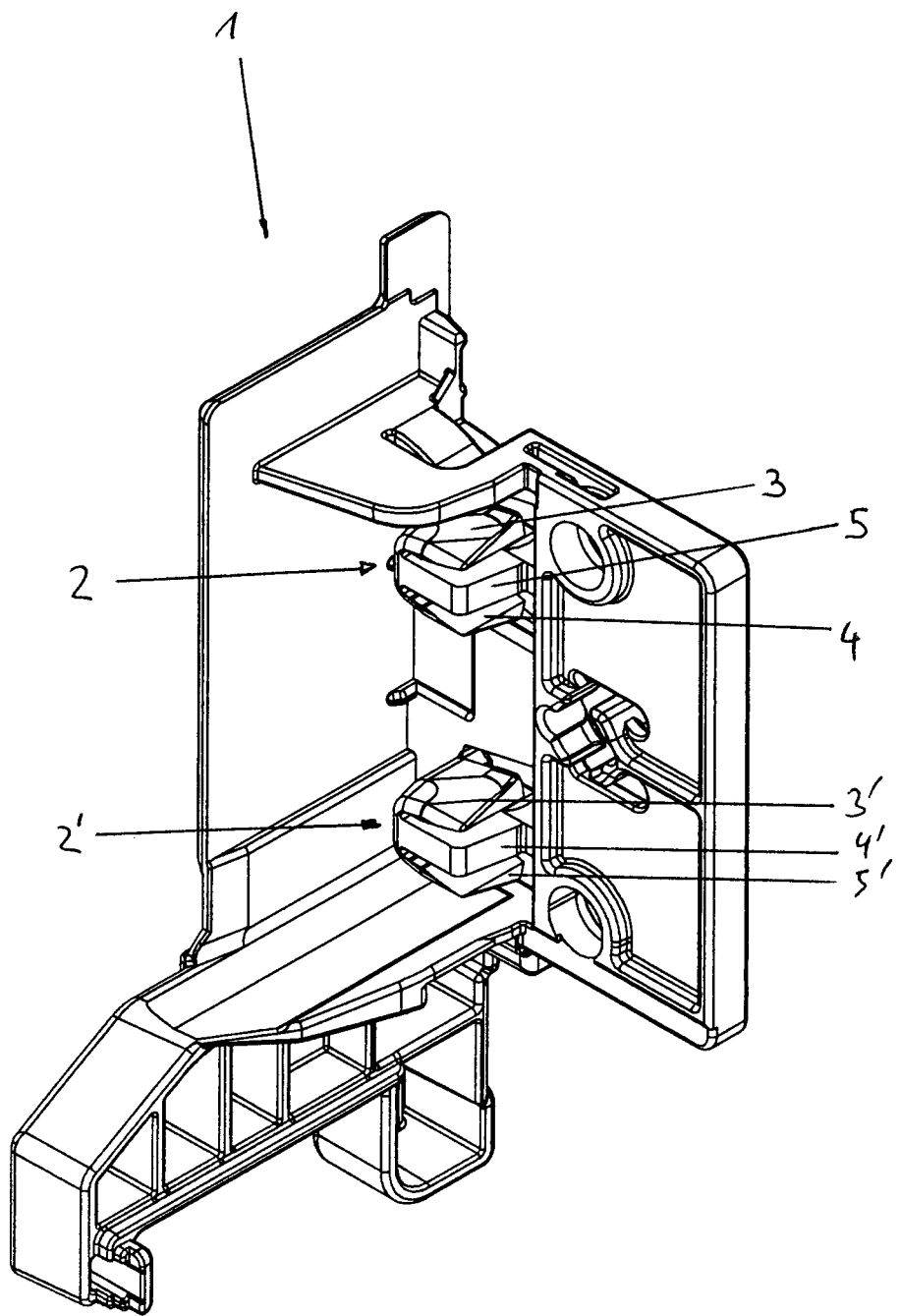
FIG. 1 shows a perspective view of a connecting fitting with two fastening devices.

FIG. 1 shows a connecting fitting 1 for transversely connecting two wall parts 103 and 104 (not shown here) (see FIGS. 3a, 4a and 6b) of a furniture part 101 (not shown) (see FIGS. 7 and 8) with two fastening devices 2 and 2'. Both the fastening devices 2 and 2' are in one piece, and also the entire connecting fitting 1. In that respect, plastic is preferably used as the material for the fastening devices 2 and 2' and for the connecting fitting 1.

This FIG. 1 shows the fastening devices 2 and 2' for connecting two wall parts 103 and 104 of a furniture part 101, in particular a rear wall 111 (see for example FIG. 3a) to a side wall 112 (see for example FIG. 3a) of a drawer 102 (FIG. 7). The fastening devices 2 and 2' on a wall part 104 each have at least one resilient latch 3 and 3' which is resilient about a notional axis A (see FIG. 2b) and which is latchable—preferably releasably—in a latching receiver 30 and 30' (see FIG. 3a) provided on or fixed to another wall part (103). The notional spring axis A of the resilient latches 3 and 3' is disposed transversely—preferably substantially at a right angle—to a wall 140 (see FIG. 3a) of the wall part 104. In this preferred embodiment, the fastening devices 2 and 2' each have at least also a respective second resilient latch 4 and 4' whose notional spring axis B (see FIG. 2b) is disposed transversely—preferably substantially at a right angle—to a wall 140 of the wall part 104. In this arrangement, the resilient latches 3 and 3' and 4 and 4' respectively are arranged substantially symmetrically.

Provided between the two resilient latches 3, 4 and 3', 4' respectively is a limb 5 and 5' respectively which contributes to enhancing the stability of the respective fastening device 2 and 2'.

Figure 4A:
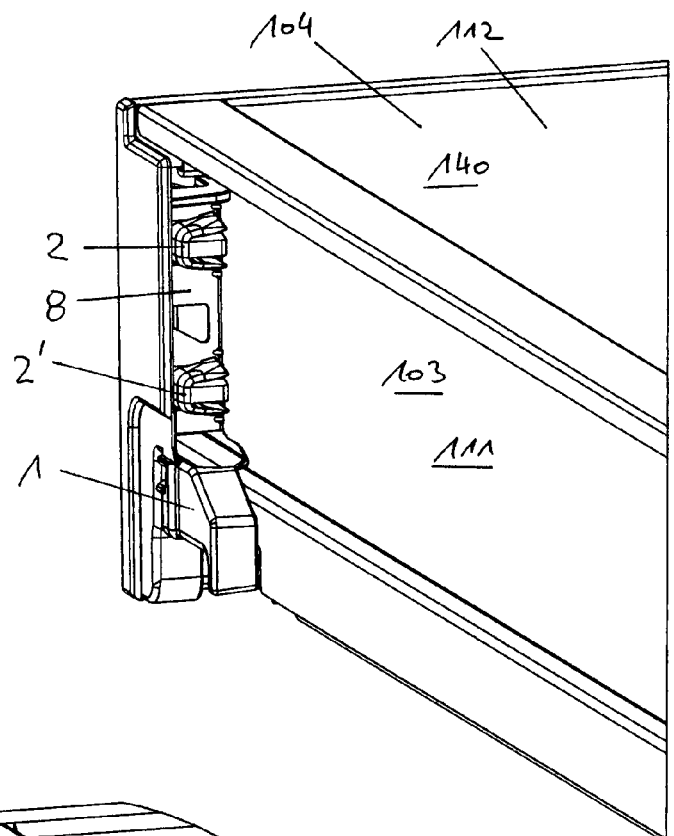
FIG. 4b shows a detail view of the FIG. 4a fastening device.

In this preferred embodiment, the connecting fitting 1 serves to connect a rear wall 111 to a side wall 112 of a drawer 102 (see in that respect FIGS. 3a and 4a). For that purpose, the connecting fitting 1 is fastened to the side wall 112 and then the rear wall 111 can be fastened to the connecting fitting 1.

FIG. 2a shows a perspective view of a connecting fitting 1 as just described with reference to FIG. 1.

FIG. 2b shows a perspective detail view of the circled region in FIG. 2a.

The fastening device 2 in this preferred embodiment has two resilient latches 3 and 4 which are connected together by a connecting portion 7. The fastening device 2 is thus of a U-shaped cross-section. Arranged on the connecting portion 7 is a limb 5 projecting between the two resilient latches 3 and 4. The two resilient latches 3 and 4 in this case have a resilient configuration, wherein the resilient latch 3 is resilient about a spring axis A and the resilient latch 4 about a spring axis B.

In this preferred embodiment, the two spring axes A and B are disposed transversely—preferably substantially at a right angle—to a wall (not shown) 140 (see FIGS. 3a, 3b, 4a and 4b) of a wall part 104 (see FIGS. 3a, 3b, 4a and 4b).

In this case, the inclined surface 20 of the resilient latch 3 has a first portion 21 which extends substantially in the same direction as the notional spring axis A. In the case of resilient latches belonging to the state of the art, these are normally displaced through about 90° relative to each other (strictly speaking, through 90° minus the angle of the rise of the portion of the inclined surface). In addition, the inclined surface has a second portion 22 which rises from the notional spring axis A or B towards the free end 6 of the respective resilient latch 3 and 4 (see in that respect FIG. 3b). In this preferred embodiment, that (second) portion 22 of the inclined surface 20 makes it possible for the fastening device 2 to be releasable without a tool (see in that respect, the specific description of FIGS. 5, 6a, 6b and 6c).

FIG. 3a shows a perspective view of two wall parts 103 and 104 in a condition of being released from each other. In this preferred embodiment, the wall part 104 is in the form of a side wall 112 of a drawer 102 (not shown), the other wall part 103 is in the form of a rear wall 111. The connecting fitting 1 is pre-mounted to the side wall 112. The connecting fitting 1 has two fastening devices 2 and 2' corresponding to a respective latching receiver 30 and 30' of the rear wall 111. In this preferred embodiment, the latching receivers 30 and 30' are in the form of openings 31—strictly speaking in the form of a through opening 32—(see FIG. 3b). In this case, the through openings 32 forming the latching receivers 30 and 30' are disposed in the latching plate 8 such that an entire edge of the through opening 32 is located in a plane substantially perpendicular to notional spring axes A and B (explained below) of respective latches 3 and 4 (see FIGS. 3a and 3b). For connecting the two wall parts 103 and 104, the latching plate 8 is pushed over the two fastening devices 2 and 2' and, after it has pressed the resilient latches 3 and 4, and 3' and 4' respectively of the fastening devices 2 and 2' together, latches behind the resilient latches 3, 4 and 3', 4' respectively of the two fastening devices 2 and 2'. That provides a stable connection of the two wall parts 103 and 104, or the side wall 112 to the rear wall 111 (see FIG. 4a).

FIG. 3b shows a detail view of the fastening device 2 as shown in FIG. 3a.

The fastening device 2 for connecting two wall parts 103 and 104 of a furniture part 101 (not shown) (see FIG. 8) is intended in this preferred embodiment to connect the rear wall 111 to the side wall 112 of a drawer 102 (not shown) (see FIG. 7). In this preferred embodiment, the fastening device 2 has a first resilient latch 3 and a second resilient latch 4, wherein the two resilient latches 3 and 4 are respectively adapted to be resiliently movable about the notional spring axis A and B. In this case the notional spring axes A and B of the resilient latches 3 and 4 are provided transversely—preferably substantially at a right angle—to the wall 140 of the wall portion 104—in this case the side wall 112. The latching receiver 30 is provided on the other wall part 103 in the form of an opening 31, and a notional normal N to the opening 31 extends substantially parallel to the notional spring axes A and B of the resilient latches 3 and 4. As a result, a joining direction X extends substantially parallel to the notional spring axes A and B of the resilient latches 3 and 4 so that the latching receiver 30 can be moved in a sole single joining direction X until reaching an end latching position, over the two resilient latches 3 and 4, and that thus permits extremely quick and simple assembly.

By virtue of this arrangement of the spring axes A and B, the longitudinal extent of the resilient latch 3 and 4—from the notional spring axes A and B towards the free end of the resilient latches 3 and 4—has no influence on the maximum wall thickness of the side wall 112. That makes it possible for narrow side walls 112 and 112' (see FIG. 7) to be produced in the case of a drawer, which is both aesthetically attractive and also leads to a space saving in the interior of the drawer.

Figure 4B:
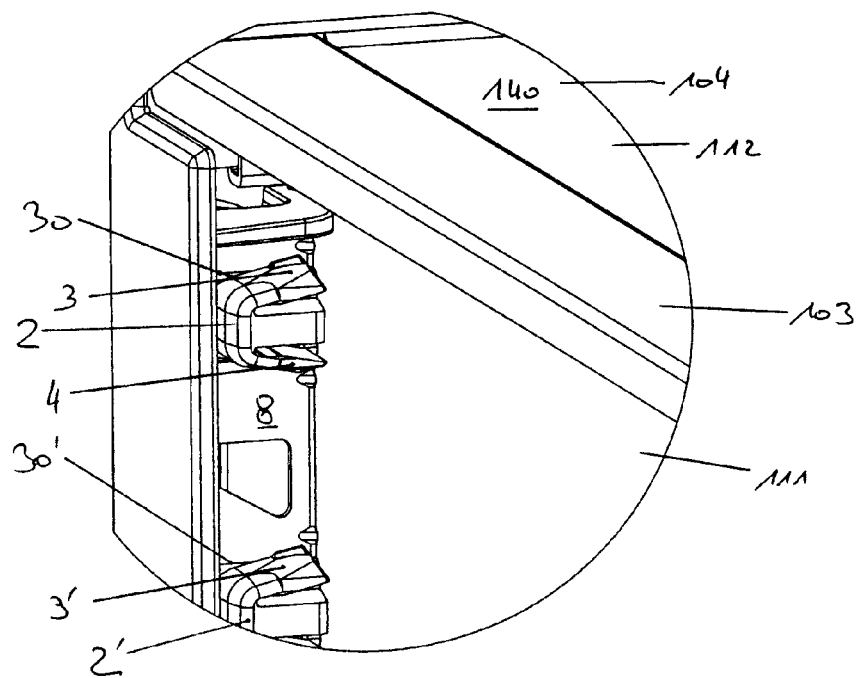

Assembly of the two wall parts 103 and 104 is performed as described below. FIGS. 3a and 3b show the two separated wall parts 103 and 104—i.e., the mutually separated side wall 112 and rear wall 111. FIGS. 4a and 4b show the side wall 112 and the rear wall 111 being connected together and latched in place by the connecting fitting 1 and the fastening devices 2 and 2' thereof. For fastening the rear wall 111 to the side wall 112, the rear wall 111 or its latching plate 8 is pushed with the two latching receivers 30 and 30' thereof, which are in the form of through openings 32, over the resilient latches 3, 4 and 3', 4' respectively in a sole single joining direction X until reaching an end latching position. For that purpose, the resilient latches have a portion 21 of an inclined surface 20 which rises towards the wall 140 of the wall part 104—in this embodiment, the side wall 112.

While the latching plate 8 is being pushed over the resilient latches 3, 4 and 3', 4', respectively, it compresses the resilient latches 3, 4 and 3', 4' respectively until it has moved beyond them and then is placed behind the resilient latches and the resilient latches 3, 4 and 3', 4' respectively are relieved again by virtue of their spring action. Thus, the latching plate 8 and therewith the rear wall 111 is fastened to the side wall 112.

As can be clearly seen from FIG. 3b, the first resilient latch 3 has not only a first portion 21 of the inclined surface 20 which rises in the direction towards the wall 140 of the side wall 112, but also a second portion 22 of the inclined surface 20 which rises substantially parallel towards the wall 140 of the wall portion 104—in this embodiment in the form of the side wall 112. That second portion 22 of the inclined surface 20 makes it possible for the connection between the two wall parts 103 and 104 by the connecting fitting 100, after assembly has been effected, to also be separated from each other again and therefore dissembled (see the specific description relating to FIGS. 6a, 6b and 6c and FIG. 5).

FIG. 5 shows a diagrammatic view of a resilient latch 3 as has been mentioned in the foregoing description. The resilient latch 3 is pivotable about a notional spring axis A. The resilient latch 3 has an inclined surface 20, and the inclined surface 20 has two different portions 21 and 22. In this case, the first portion 21 of the inclined surface 20 rises in the direction of (is inclined toward) the wall 140 of the wall part 104 and serves as an inclined introduction portion. When the latching plate 8 is pushed in (see FIGS. 3a and 4a), the latching plate 8 pivots the resilient latch 3 about the notional spring axis A and thus compresses the fastening device 2 (not shown). After the latching plate 8 has passed beyond the tip of the resilient latch 3, the spring action of the resilient latch 3 is relieved again and the latching plate 8 is fastened behind the resilient latch 3 as the resilient latches have opened up. Thus, the latching plate 8 can no longer be pulled over the resilient latch 3 (see in that respect FIGS. 4a and 4b).

For again releasing the latching plate 8, the resilient latch 3 has a second portion 22 of the inclined surface 20, which rises from the notional spring axis A towards the free end 6 of the resilient latch 3. That portion 22 serves as an inclined disengagement portion. When now the rear wall 111 is pivoted in the direction of the side wall 112 and thus towards the resilient latch 3, the resilient latch 3 is again compressed by the latching plate 8 and the rear wall 111 can be removed from the side wall 112 or the connecting fitting 1 again.

That dismantling process is shown in FIGS. 6a, 6b and 6c, in which the wall part 103 already has an angle differing from a right angle relative to the wall part 104. The latching plate 8 compresses the fastening device 2—or its resilient latches 3 and 4 again, thereby permitting removal of the wall part 103. That is made possible by the second portion 22 (see FIGS. 3b and 5) of the inclined surface 20, which rises from the notional spring axis A (see FIGS. 2b and 5) towards the free end (is inclined towards the free end) of the resilient latch 3 and 4. This therefore provides a fastening device which is both compact and also releasable again.

Figure 8:
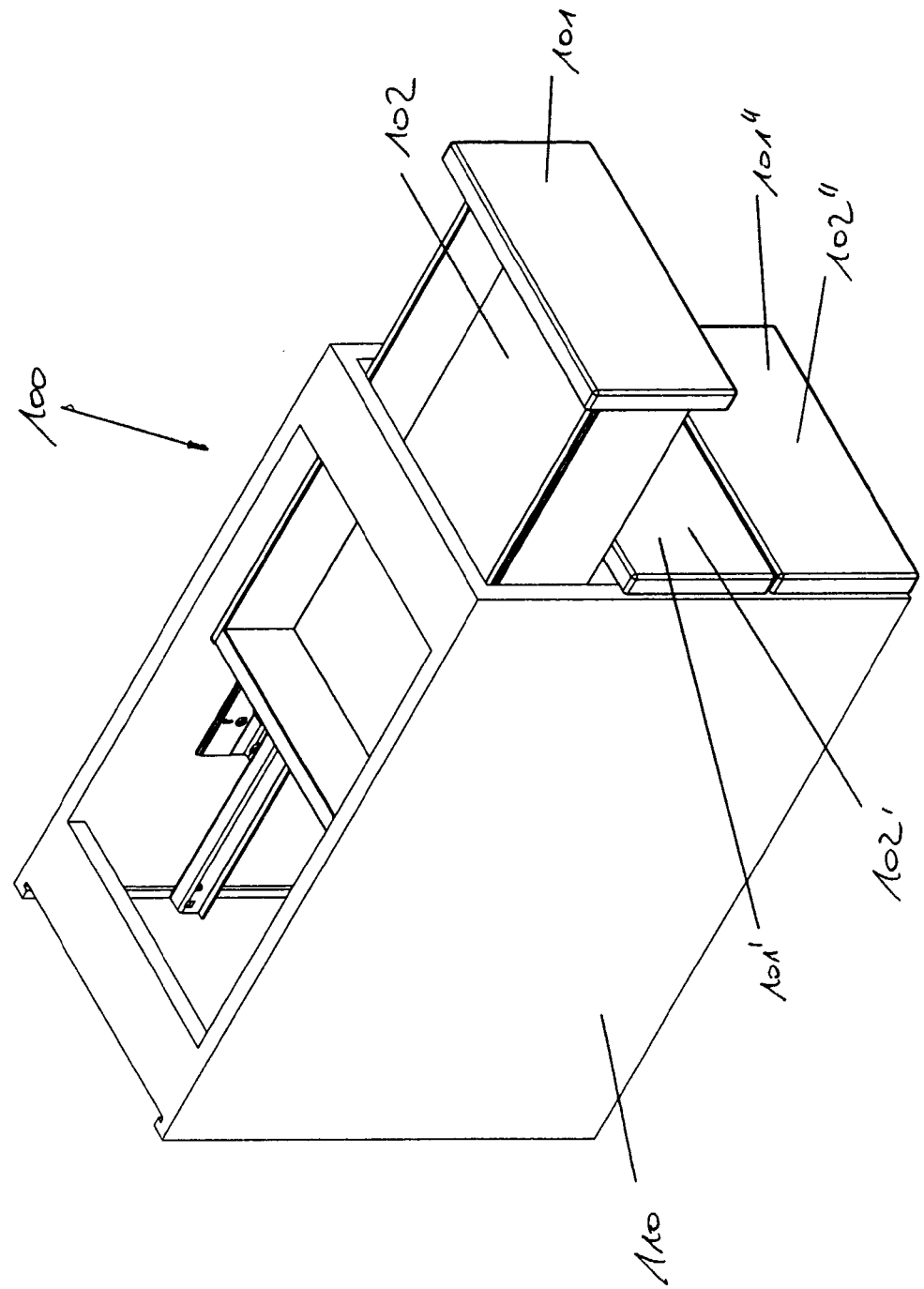
FIG. 8 shows a perspective view of an article of furniture with three drawers.

FIG. 7 shows a furniture part 101 having wall parts 103, 104 and 104'. In this case, the wall parts 104 and 104' are in the form of side walls 112 and 112' and the wall parts 103 is in the form of a rear wall 111. The side wall 112 is connected to the rear wall 111 by a connecting fitting according to the preceding description. The side wall 112' is connected to the rear wall 111 by a connecting fitting 1' which is admittedly not of an identical structure to the connecting fitting 1 but is in substance similar thereto. FIG. 8 shows an article of furniture 100 having a furniture carcass 110. The article of furniture 100 further has three furniture parts 101, 101' and 101" in the form of drawers 102, 102' and 102" —as just described with reference to FIG. 7.

The invention claimed is:

1. A fastening device for connecting two side walls of a furniture part, comprising:
   a resilient latch to be mounted on a first side wall, said resilient latch being configured to be resilient about a notional spring axis; and
   a latching receiver to be mounted on a second side wall, said resilient latch being configured to be latchable into said latching receiver;
   wherein said resilient latch is configured such that said notional spring axis extends transversely relative to the first side wall; and
   wherein said latching receiver on the second side wall comprises a latching plate having a through opening formed therein, a notional normal to said opening of said latching receiver extending substantially parallel to said notional spring axis of said resilient latch such that an entire edge of said through opening is located within a plane substantially perpendicular to said notional spring axis of said resilient latch.

2. The fastening device according to claim 1, wherein said resilient latch is a first resilient latch, said fastening device further comprising a second resilient latch having a notional spring axis extending transversely relative to the first side wall.

3. The fastening device according to claim 2, wherein said first resilient latch and said second resilient latch are substantially parallel to each other and are connected together.

4. The fastening device according to claim 2, further comprising a limb between said first resilient latch and said second resilient latch.

5. The fastening device according to claim 1, wherein said resilient latch has a one-piece construction.

6. The fastening device according to claim 1, wherein said resilient latch is made from plastic material.

7. The fastening device according to claim 1, wherein said resilient latch has a first inclined surface inclined upwards toward the first side wall, and said resilient latch has a second inclined portion inclined upwards from said notional spring axis towards a free end of said resilient latch.

8. The fastening device according to claim 1, wherein said resilient latch is configured to be releasable from said latching receiver without a tool.

9. The fastening device according to claim 1, wherein the first side wall on which said resilient latch is to be mounted is a drawer side wall, and the second side wall on which said latching receiver is to be mounted is a drawer rear wall.

10. The fastening device according to claim 1, wherein said resilient latch is configured to be releasably latchable into said latching receiver.

11. The fastening device according to claim 1, wherein said resilient latch is configured such that said notional spring axis extends substantially at a right angle relative to the first side wall.

12. The fastening device according to claim 2, wherein said first resilient latch is configured such that said notional spring axis of said first resilient latch extends substantially at a right angle relative to the first side wall, and said second resilient latch is configured such that said notional spring axis of said second resilient latch extends substantially at a right angle relative to the first side wall.

13. A connecting fitting for transversely connecting two side walls of a furniture part, said connecting fitting including a first fastening device and a second fastening device, each of said first fastening device and said second fastening device being configured according to claim 1.

14. The connecting fitting according to claim 13, wherein said connecting fitting has a one-piece construction.

15. A drawer comprising:
a plurality of side walls; and
said connecting fitting according to claim 13 arranged to connect two of said side walls.

16. An article of furniture comprising said drawer according to claim 15.

* * * * *